United States Patent
Funfstuck

[15] 3,636,764
[45] Jan. 25, 1972

[54] ELECTROMAGNET FOR BLOOD FLOWMETERS AND THE LIKE

[72] Inventor: Horst Funfstuck, Los Angeles, Calif.
[73] Assignee: Statham Instruments, Inc., Oxnard, Calif.
[22] Filed: Oct. 30, 1969
[21] Appl. No.: 872,688

[52] U.S. Cl. .....................73/194 EM, 128/2.05 F, 336/233
[51] Int. Cl. .........................................................G01p 5/08
[58] Field of Search................29/605, 608, 606, 602, 527.3, 29/456; 73/194 EM; 336/233, 218, 225, 221; 264/267, 272; 128/2.05

[56] References Cited

UNITED STATES PATENTS

| | | | |
|---|---|---|---|
| 1,994,534 | 3/1935 | Robinson | 29/608 X |
| 2,419,847 | 4/1947 | Mittermaier | 336/233 X |
| 2,568,310 | 9/1951 | Whiffen | 29/608 X |
| 2,969,673 | 1/1961 | Snyder et al. | 73/194 EM UX |
| 3,255,512 | 6/1966 | Lochner et al. | 336/233 X |
| 3,308,659 | 3/1967 | Herndon | 73/194 EM |
| 3,309,924 | 3/1967 | Kolin et al. | 73/194 EM |
| 3,316,762 | 5/1967 | Westersten | 73/194 EM |
| 3,490,282 | 1/1970 | Wada | 73/194 EM |

OTHER PUBLICATIONS

Biotronex Laboratory, Inc.; Flow Transducers-Information and Price List P-700; Feb. 15, 1967

*Primary Examiner*—Charles A. Ruehl
*Attorney*—Philip Subkow, Paul L. Gardner and Kendrick and Subkow

[57] ABSTRACT

An improved electromagnet for blood flowmeters and the like is made by filling the open central portion of a magnetizing coil with a mixture of iron powder suspended in a quick-hardening epoxy resin. The mixture is thereafter heated and cured to form an electrically nonconductive magnetic core.

3 Claims, 4 Drawing Figures

PATENTED JAN 25 1972 3,636,764

INVENTOR
HORST FUNFSTUCK
BY KENDRICK and SUBKOW
Paul L. Gardner
ATTORNEYS

3,636,764

ELECTROMAGNET FOR BLOOD FLOWMETERS AND THE LIKE

BACKGROUND OF THE INVENTION

The present invention relates to an improved electromagnet, particularly suited for use in a blood flowmeter or the like, and an improved process for manufacturing the same.

One currently popular technique for determining the quantity of blood flowing through a blood vessel is by applying a magnetic field across the vessel to induce an electric signal in the blood, and thereafter measuring the magnitude of the signal by spaced electrodes which contact the outer surface of the vessel. The magnitude of the measured signal is directly related to the velocity of the blood flowing through the vessel, from which the quantity of blood flowing may be determined.

Suitable instruments for carrying out the above technique are shown, for example, in U.S. Pat. No. 3,316,762, and copending U.S. Pat. application Ser. No. 802,517, now U.S. Pat. No. 3,580,071. Such an instrument typically comprises an insulative hollow cylindrical tube adapted to fit around a blood vessel under test, one or more magnets mounted on the exterior of the tube, and a pair of spaced electrodes connected to a suitable signal measuring apparatus for measuring the magnitude of the electric signal induced in the blood by the electromagnets.

While both coreless field magnets and electromagnets having iron cores have been employed to induce the electric signal in the blood, electromagnets employing iron cores provide concentrated magnetic fields, thereby improving the performance of their instruments, increasing their efficiency and decreasing their required size. However, such electromagnets have heretofore been subject to several disadvantages. The iron cores are commonly made of transformer lamination material, ferrite or iron oxide. These materials are rigid and relatively difficult to machine or shape, and the cores must be machined to precisely fit the coils and the exterior surfaces of the tubes on which they are mounted. As a result, an electromagnet with a properly fitting core has heretofore been expensive and difficult to manufacture.

Another problem heretofore associated with instruments employing electromagnets having solid iron cores is that such cores are electrically conductive, and introduce eddy current effects into their systems. Such eddy current effects generate artifact voltages which result in baseline instability in the signal measuring apparatus.

SUMMARY OF THE INVENTION

In view of the foregoing, it is an object of the present invention to provide an improved electromagnet, particularly suited for use in blood flowmeters and the like which employs an iron core that fits its coil exactly, introduces minimal eddy current effects and capacitive coupling into its system, produces no electrical shorts, and yet is relatively inexpensive to manufacture. It is a further object of this invention to provide an improved process for manufacturing such an electromagnet.

The foregoing and other objects have been realized by the improved electromagnet of the present invention, which is manufactured by filling the open central portion of a coil with a generally viscous mixture of ferromagnetic particles (e.g., iron powder) suspended in a relatively quick-hardening resin. Thereafter, the viscous mixture is heated and cured to form a solid, electrically nonconductive magnetic core.

DETAILED DESCRIPTION OF A PREFERRED EMBODIMENT

Figure 1:
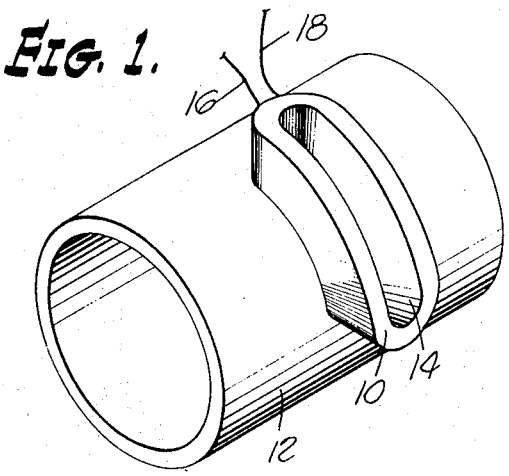
FIG. 1 is a perspective view illustrating one of the initial steps in making a blood flowmeter according to the teachings of the present invention, i.e., mounting a magnetizing coil on the exterior surface of a cylindrical tube which is adapted to fit around a blood vessel to be tested.
Figure 3:
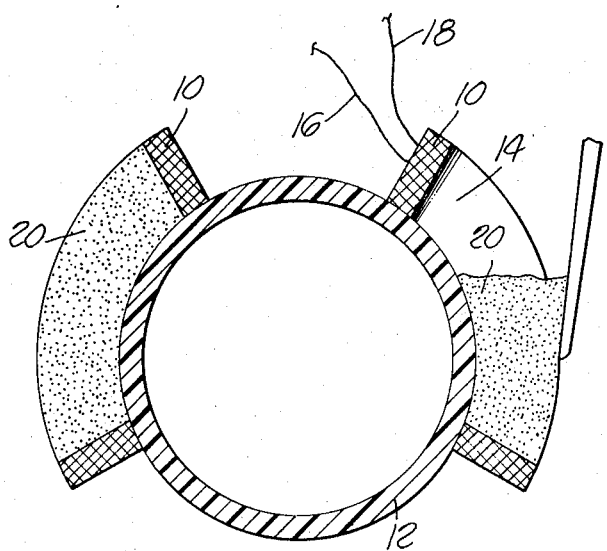
FIG. 3 is a sectional end elevation view showing the viscous mixture of iron powder and epoxy resin being packed into the open central portion of one of the coils mounted on the cylindrical tube.

The first step in making a blood flowmeter according to the process of the present invention is to wind a wire of conductive material around a suitable mandrel (not shown) to form a magnetizing coil 10 which is adapted to be mounted on the exterior surface of a hollow cylindrical tube 12. As best shown in FIGS. 1 and 3, the coil has an open central portion 14 and is generally arcuate in shape so that it will conform to the exterior surface of the tube 12. The mandrel on which the coil 10 is wound should be so designed that the coil 10 wound thereon will assume the configuration shown in the drawings. Preferably, the mandrel is made of a soft, smooth material so that it will not cut into the insulation around the coil windings. Leads 16, 18 from the coil 10 are adapted to be connected to a suitable source of AC power (not shown).

After the coil 10 has been wound, it is removed from the mandrel and glued or otherwise suitably mounted on the exterior surface of a hollow cylindrical tube or lumen 12. The tube 12 is adapted to receive a blood vessel to be tested, and is made of an electrically insulative material. For the reasons set forth in copending U.S. application Ser. No. 802,517, it may be desirable to mount two coils 10, 10 on the tube 12, as shown in FIG. 3.

Figure 2:
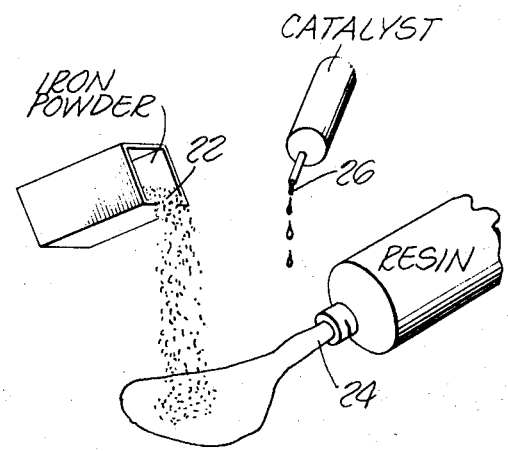
FIG. 2 is a perspective view schematically illustrating another of the steps in the process of the present invention, i.e., mixing a quantity of iron powder with an epoxy resin and a suitable hardening catalyst to form a viscous mixture which will subsequently harden into a solid, electrically nonconductive, magnetic core.

After the coil or coils 10, 10 have been mounted on the tube 12, the central portion 14 thereof may be packed with a liquid mixture 20 of relatively high viscosity which will harden into a solid, electrically nonconductive, magnetic core. As shown in FIG. 2, the viscous mixture 20 is formed by mixing a measured quantity of particulate ferromagnetic material, such as high-permeability iron powder 22, with a measured quantity of epoxy resin 24 and a suitable catalyst 26 which will cause the mixture to harden relatively quickly. Of course, ferromagnetic materials other than iron (e.g., cobalt, nickel, etc., and mixtures thereof) may be effectively employed.

The concentration of iron powder 22 in the mixture 20 must be sufficient to render the finished electromagnet capable of establishing the desired degree of magnetic flux; and the mixture 20 must be of sufficient fluidity to be readily packed into the central portion 14 of the coil 10.

By way of example, the viscous substance 20 may be formed by mixing 10 grams of epoxy resin (e.g., Shell Chemical Corporation 0828) with 44 grams of iron powder (e.g., 0Ancor EP 1024, from Hoeganeas Corporation, Riverton, N.J.), and thereafter mixing 3.2 grams of the iron powder-epoxy resin mixture with 1 drop (about 0.03 gram) of a hardening catalyst (e.g., 09 from Emerson Cuming, Inc.).

The viscous mixture 20 is then packed into the open center portion 14 of the coil 10, as shown in FIG. 3, so as to conform to and be in intimate and continuous contact with the interior wall of the coil 10 and a portion of the exterior surface of the tube or lumen 12. The mixture is then heated by suitable means (e.g., a lamp) for a suitable period of time (e.g., 1 minute), and thereafter cured.

Curing of the mixture may be effected by letting the packed coil set at room temperature for a suitable period of time (e.g., 24 hours). Alternatively, the curing step may be accelerated by placing the packed coil in an oven (e.g., at 170° F.) for a suitable period of time (e.g., 1 hour).

The finished core 20 (FIG. 4) is an electrically nonconductive, magnetic solid.

Figure 4:
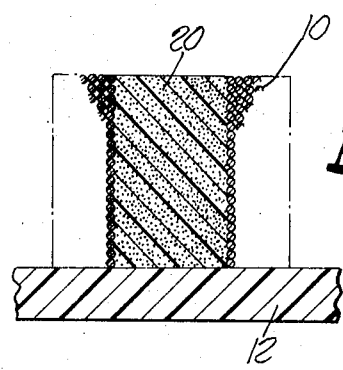
FIG. 4 is a sectional view taken along the line 4—4 of FIG. 3, showing the manner in which the viscous mixture of iron powder and epoxy resin completely fills the central portion of the coil in which it is packed and conforms precisely to the shape of the interior wall of the coil.

From the foregoing, it will be readily appreciated that the finished core 20, having been packed into the open central portion 14 of the coil 10 while of a viscous or pasty consistency, will precisely fit the interior wall of the coil 10 and the exterior surface of the lumen 12, as shown in FIG. 4. Since no machining or cutting of the core is required, the cost of making the electromagnet (coil 10 and core 20) is relatively inexpensive.

Since the finished core is an electrically nonconductive magnetic material, no electrical shorts will be produced between the coil windings and the core. Moreover, only minimal eddy current effects and capacitive coupling will be introduced.

Still another advantage realized by an electromagnet manufactured according to the process described above over electromagnets which employ a machined iron core, is an increase of approximately 20 percent in the magnetic intensity of the electromagnet. This increase is attributed to the fact that the substance 20 which hardens into the finished core is packed into the coil 10 while in a viscous condition, and thereby fills substantially all of the voids in the interior wall of the coil.

I claim:

1. An improved blood flowmeter comprising:
   an insulative hollow cylindrical tube adapted to fit around a blood vessel;
   an electromagnet mounted on said tube for applying a magnetic field across a blood vessel to induce an electric signal in the blood flowing therethrough;
   said electromagnet comprising:
   an electrically conductive coil having an interior wall defining an open central portion; and
   an electrically nonconductive magnetic core substantially filling said open central portion of said coil and conforming to and being in intimate and continuous contact with said interior wall of said coil and a portion of the exterior surface of said tube; said core comprising a hardened resin having ferromagnetic particles suspended therein; and
   signal measuring means operatively connected to said tube for measuring the magnitude of the electric signal induced in the blood flowing through the blood vessel.

2. A blood flowmeter in which a magnetic field is induced in a blood vessel by means of an electromagnet to induce an electrical signal when blood flows through said blood vessel, the improvement which comprises a hollow cylindrical tube adapted to fit around the blood vessel, an electromagnet mounted on said tube, for applying a magnetic field across said tube, said electromagnet comprising an electrically conductive coil having an interior wall defining an open central portion; and an electrically nonconductive magnetic core substantially filling said open central portion of said coil, and conforming to and being in intimate and continuous contact with said interior wall of said coil, said core comprising a resin having therethrough magnetic particles suspended therein.

3. A lumen for a blood flowmeter, said lumen comprising an insulated hollow cylindrical tube adapted to fit around a blood vessel, an electromagnet mounted on said tube to apply a magnetic field across said tube, said electromagnet comprising an electrically conductive coil having an interior wall defining an open central portion and an electrically nonconductive magnetic core substantially filling said open central portion of said coil and conforming to and being in intimate and continuous contact with said interior wall of said coil, said core comprising a hardened resin with magnetic particles suspended therein.

* * * * *